US005740924A

United States Patent [19]

Hunt

[11] Patent Number: 5,740,924
[45] Date of Patent: Apr. 21, 1998

[54] ORGANIZER RACK COMPONENT AND METHOD OF USING SAME

[75] Inventor: Thomas A. Hunt, Encinitas, Calif.

[73] Assignee: Spectrum Concepts, Inc., Encinitas, Calif.

[21] Appl. No.: 711,039

[22] Filed: Sep. 10, 1996

[51] Int. Cl.[6] .................................................. A47F 7/00
[52] U.S. Cl. ........................ 211/40; 211/194; 312/9.9; 206/308.1; D6/407
[58] Field of Search ........................ 211/40, 41, 183, 211/59.4, 194; 312/9.9, 9.1, 9.48; 206/387.15, 308.1; D6/407

[56] References Cited

U.S. PATENT DOCUMENTS

| | | | |
|---|---|---|---|
| 2,314,557 | 3/1943 | Rosenfeld | 211/40 |
| 2,346,705 | 4/1944 | Sabin | 211/40 |
| 3,185,307 | 5/1965 | Higgins | 312/9.9 X |
| 3,442,394 | 5/1969 | McCune et al. | 211/40 |
| 5,199,577 | 4/1993 | Curtis | 211/40 |
| 5,370,242 | 12/1994 | Huang | 211/59.4 X |
| 5,380,079 | 1/1995 | Hamilton | 211/40 X |

Primary Examiner—Robert W. Gibson, Jr.
Attorney, Agent, or Firm—Bernard L. Kleinke; Peter P. Scott

[57] ABSTRACT

The organizer rack component includes a pair of parallel, spaced apart elongated rails for engaging an item of furniture, and a series of parallel, spaced apart cross members or ribs connected integrally at their opposite ends to the rails for defining a series of elongated access openings or apertures to receive boxlike articles therein. The ribs are spaced apart by a given distance sufficiently larger than the corresponding dimension of the article to enable the ribs to receive and retain the article therebetween. Pegs or ears extending outwardly from the rails are received in spaced apart openings in the furniture item to enable the organizer rack component to be held securely thereto in an aesthetically pleasing manner.

24 Claims, 5 Drawing Sheets

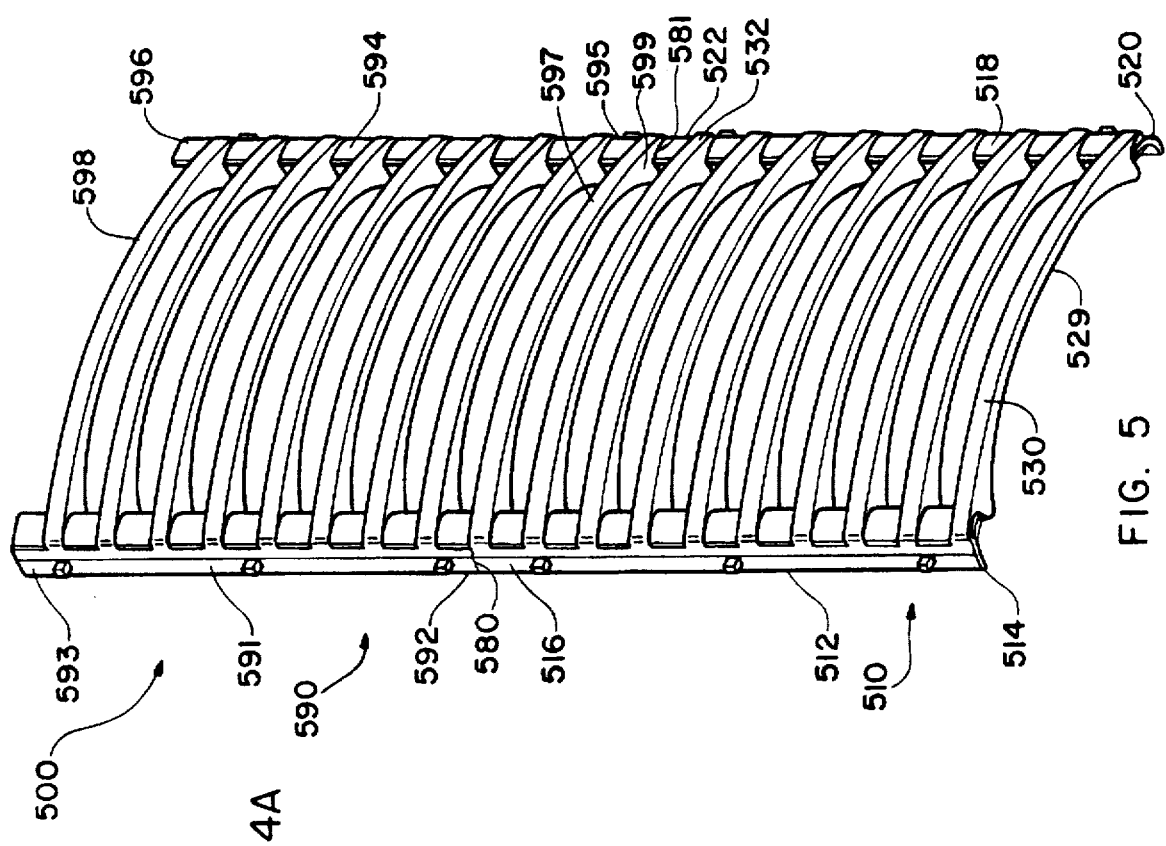
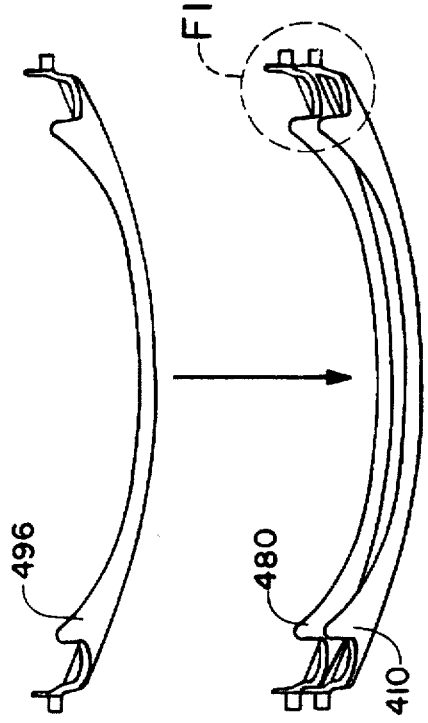
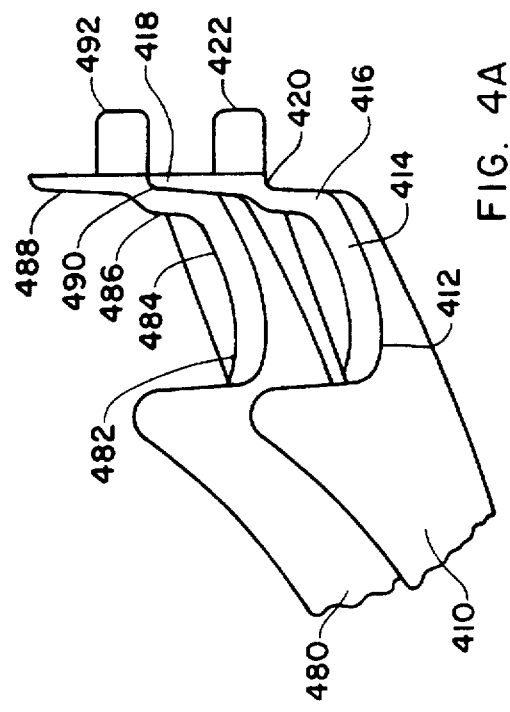
FIG. 5
FIG. 4
FIG. 4A

ORGANIZER RACK COMPONENT AND METHOD OF USING SAME

TECHNICAL FIELD

The present invention relates in general to an improved organizer rack component and a method of using it. The invention more particularly relates to an organizer rack component which facilitates the storage of articles according to a novel method.

BACKGROUND ART

The organization and storage of boxlike articles, such as video tapes, cassette tapes and compact disc jewel boxes (boxes), has been the subject of furniture design, especially furniture capable of organizing a collection of such boxes. By organizing and storing the boxes, it was possible to easily retrieve and replace a particular desired box from among the stored collection of boxes.

A furnishing including a receptacle defining a storage space and having a large front access opening to receive and store the boxes has been utilized. The boxes have been inserted through the front access opening and rest on a bottom wall of the receptacle, side by side, with the associated identifying indicia facing outwardly to facilitate identifying a desired box to be retrieved. Depending upon the size of the access opening, the boxes have been stored in rows, either horizontally or vertically.

Although this type of receptacle enabled the boxes to be organized and stored together, thereby enabling a desired box to be located easily, retrieving the desired box from within the receptacle proved to be somewhat inconvenient and awkward. Due to the similar size and shape of adjacent boxes, the desired box did not extend outwardly from the neighboring boxes to provide a projection which could be grasped. The retrieval of the desired box was further complicated where it was not possible to even grasp the top of the box, such as when the opening was sized to match the boxes or where the boxes were stacked on top of one another.

Furthermore, replacing a box in its proper position has been difficult and awkward as well. In this regard, adjacent boxes in the storage space were required to be separated to make room to receive the box to be replaced.

Another prior known organization and storage accessory has been used in conjunction with an item or article of furniture to facilitate the organization and storage of boxes. This known accessory included a receptacle defining a storage space and having a large front access opening as did the other receptacle. However, this receptacle further included a plurality of spaced apart horizontal rails mounted within the storage space in a rack configuration to receive slidably boxes therein.

The rails could be secured within the organizer accessory contained in an item of furniture, such as an entertainment center or a desk, to organize and support a number of boxes. When positioned in the receptacle, and supported by the rails, the boxes were spaced apart and capable of being removed and replaced without great difficulty.

In order to facilitate removal, the rails included a spring arrangement to eject the boxes individually and partially from their storage spaces for easy grasping by the user to remove the desired box from the accessory. One version of the accessory has used molded plastic springs. However, the springs tend to lose their spring force, and thus, in time, become unable to urge the boxes out of their storage spaces.

Another version employs bungee cord material to eject the boxes, but such material also suffers from the same drawback. Also, such a version cannot be readily adjusted in size without cutting and reattaching the cord.

The appearance of such an organizer was acceptable where the receptacle was completely filled with boxes, i.e., only the edges of the boxes and the small spaces therebetween were exposed. However, when one or more of the boxes were removed, thereby exposing the rails, the appearance of the organizer was greatly diminished. As a result, the use of such rails in high quality and fine items of furniture is not highly desirable, because the aesthetic appearance of the furniture items is not enhanced and is tarnished or diminished. This is an extremely significant disadvantage because the appearance of the item of furniture is of prime importance.

Purchasers of such high quality items of furniture were less likely to buy an expensive piece of furniture which was not aesthetically pleasing to the eye. Thus, the use of rails in the organizer accessory contained in the furniture item affected the salability thereof. Therefore, it would be highly desirable to have a new and improved organizer rack component for use in an item of high quality furniture, which is highly attractive, and which does not detract from the appearance of the furniture item.

Furthermore, the installation of the rails in the known organizer has been somewhat labor intensive. Each of the rails was required to be secured within the receptacle, and aligned with the corresponding rail on the opposite side of the storage space to ensure the received box was held substantially horizontally. As a result, the installation of these rails increased the overall manufacturing time of the furniture item, and also increased the cost of manufacturing the furniture item.

Additionally, the rails were not easily stored before installation to prevent damaging scratches or other undesirable marks from being received thereon. Such scratches further detracted from the appearance of the organizer, and consequently the furniture item which contained the organizer.

Therefore, it would also be highly desirable to provide a new and improved organizer rack component which is readily installed, and which is stored in a scratch resistent manner.

DISCLOSURE OF INVENTION

Therefore, the principal object of the present invention is to provide a new and improved organizer rack component for use with high quality furniture items, and a method of using it, wherein the organizer rack component is aesthetically pleasing, and is capable of being stored with like components in a scratch resistent manner. Such an organizer rack component should be relatively easy to install.

Briefly, the above and further objects of the present invention are realized by providing a new and improved organizer rack component which can be incorporated into fine furnishings to store boxlike articles in an attractive manner, and which is used according to a novel method of the present invention.

The organizer rack component includes a pair of parallel, spaced apart elongated rails for engaging an item of furniture, and a series of parallel, spaced apart cross members or ribs connected integrally at their opposite ends to the rails for defining a series of elongated access openings or apertures to receive boxlike articles therein. The ribs are spaced apart by a given distance sufficiently larger than the corresponding dimension of the article to enable the ribs to receive and retain the article therebetween. Pegs or ears extending outwardly from the rails are received in spaced apart openings in the furniture item to enable the organizer rack component to be held securely thereto in an aesthetically pleasing manner.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 4 is a side view of the rack component of FIG. 1 with like components, illustrating the storage of like organizer rack components according to the present invention;

FIG. 4A is a broken away enlarged view illustrating the encircled portion of FIG. 4;

FIG. 5 is a pictorial view of an organizer rack component similar to the component of FIG. 2 and assembled with a like component to illustrate an alignment of organizer rack components to form a continuous organizer rack structure according to the present invention;

BEST MODE FOR CARRYING OUT THE INVENTION

Figure 1:
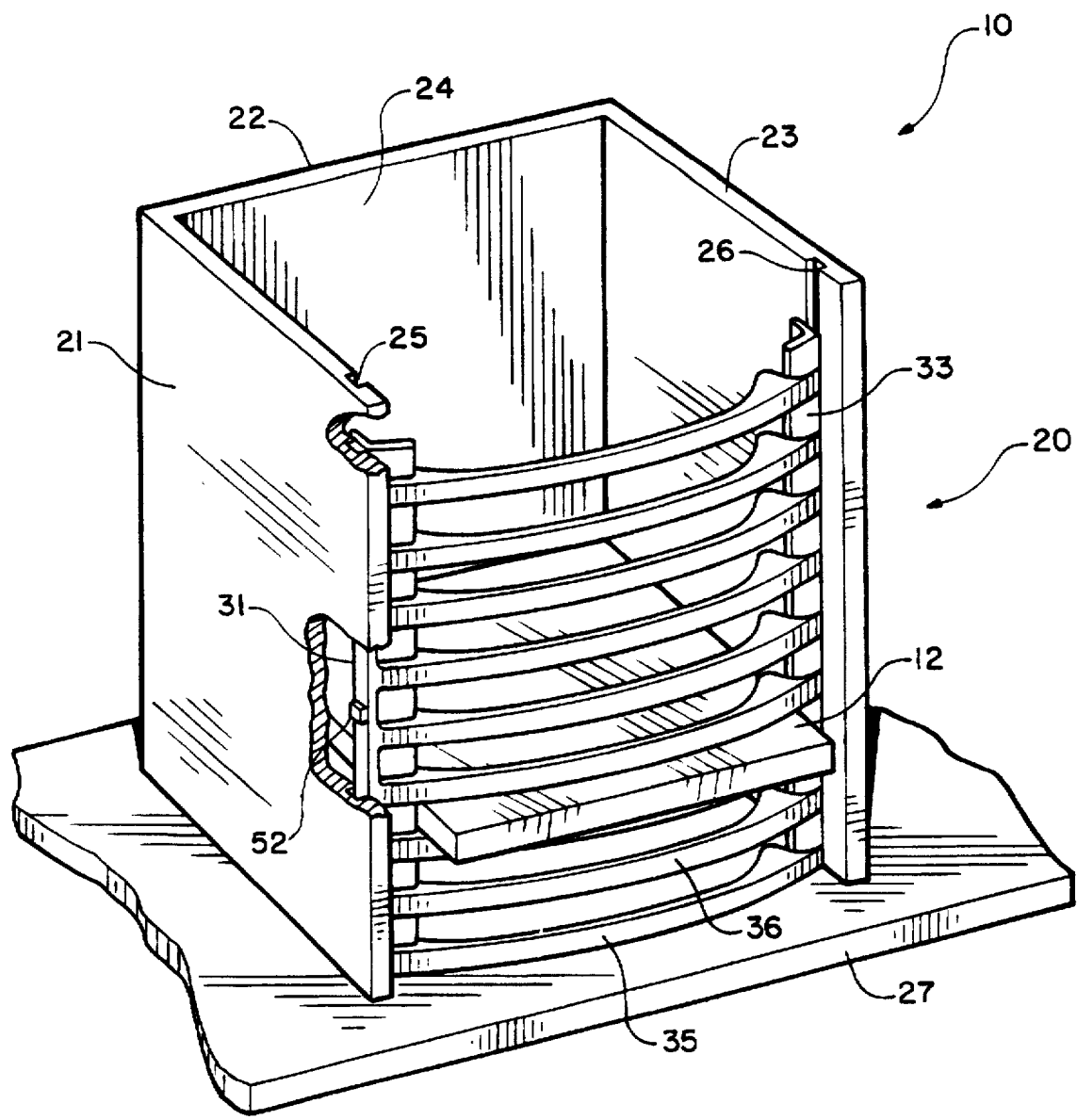
FIG. 1 is a partially cut-away pictorial view illustrating an organizer rack component coupled to an item of furniture, which organizer rack component is constructed in accordance with the present invention.
Figure 3:
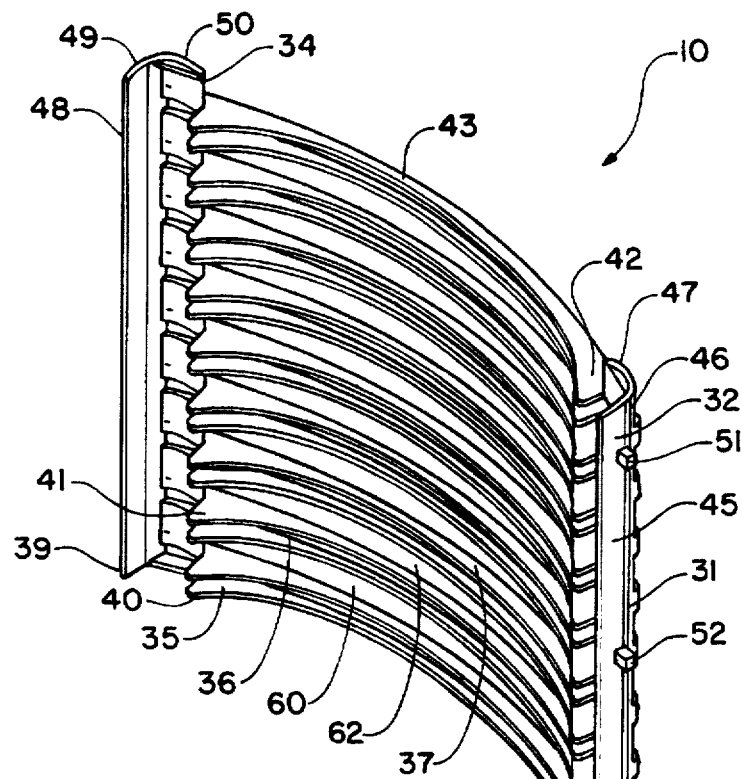
FIG. 3 is a rear pictorial view of the organizer rack component of FIG. 1.
Figure 2:
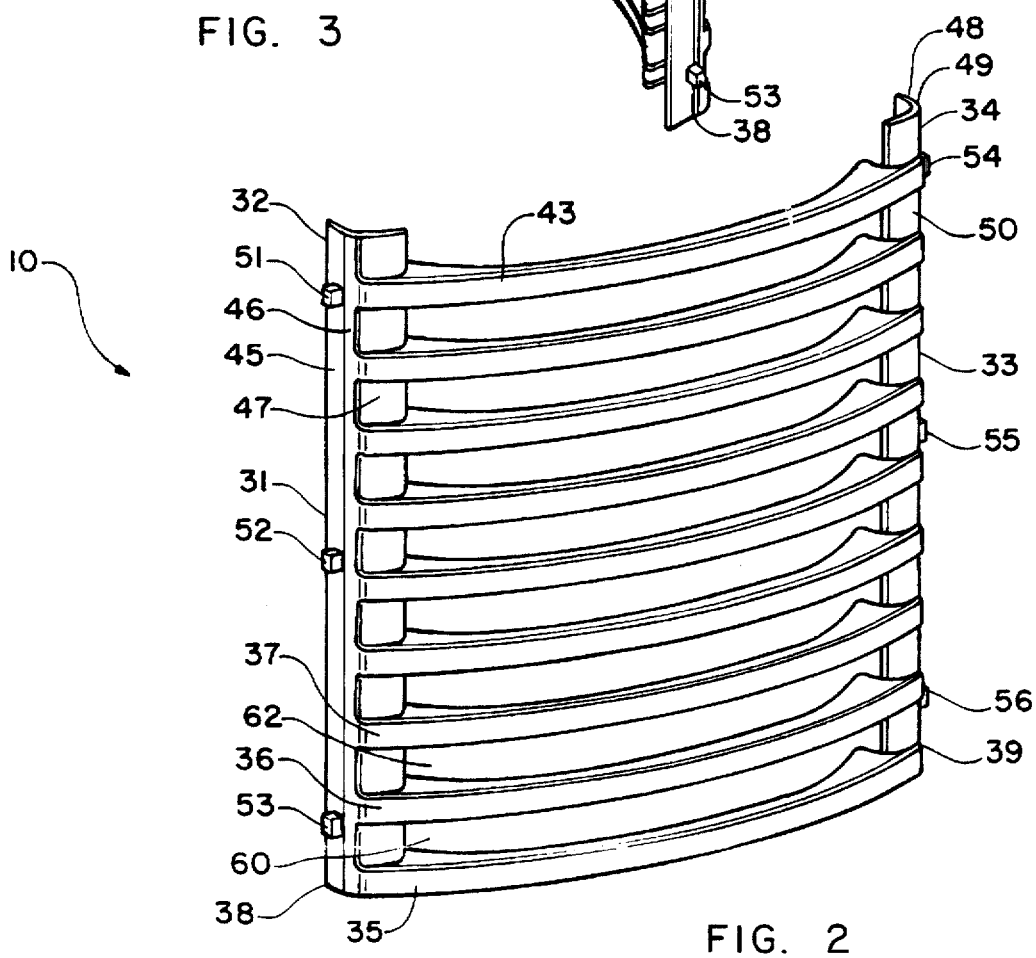
FIG. 2 is an enlarged front pictorial view of the organizer rack component of FIG. 1.

Referring now to the drawings, and more particularly to FIGS. 1–3 thereof, there is shown an organizer rack component 10 which is constructed in accordance with the present invention. The organizer rack component 10 is adapted to cooperate with an item of furniture 20 for organizing and storing boxlike articles, such as a CD box 12, wherein the organizer rack component 10 is incorporated into the furniture item 20 in an aesthetically pleasing manner. It will be understood by one skilled in the art that other boxlike articles, such as video tapes, may also be stored by the organizer rack component 10.

The furniture item 20 is generally representative of fine furnishings, and includes a vertical back wall 22 connected to a vertical side wall 21 and another vertical side wall 23 to define a U-shaped support structure having an interior storage space generally indicated at 24 therebetween to receive the article 12. A lower shelf 27 (FIG. 1) encloses one end of the space 24, and facilitates the support of walls 21–23. A top wall 28 (FIG. 1A) encloses the top end of the space 24, and also facilitates the support of walls 21–23.

Spaced apart openings in the form of elongated grooves or slots 25 and 26 in side walls 21 and 23, respectively, enable the organizer rack component 10 to be secured to the furniture item 20. As will be described hereinafter in greater detail, the spaced apart openings could be in the form of circular holes rather than elongated grooves.

The organizer rack component 10 is preferably constructed from a flexible resilient material, such as a thermoplastic material. In this way, the organizer rack component 10 may be quickly and easily coupled to the furniture item 20.

In use, the organizer rack component 10 is flexed and aligned with the spaced apart openings 25 and 26. The organizer rack component 10 is then inserted into the openings 25 and 26, before the component 10 is released. As a result, the component 10 is secured to the furniture item 20.

The article 12 is inserted into the organizer rack component 10, and is received within the space 24. When released, the article 12 is supported by the organizer rack component 10.

Considering now the organizer rack component 10 in greater detail with reference to FIGS. 1–3, the organizer rack component 10 includes a pair of spaced apart elongated parallel L-shaped rails 31 and 33 having front portions 47 and 50, intermediate portions 46 and 49, and side portions 45 and 48, respectively. A series of cross members or ribs, including ribs 35, 36, 37 and 43, are connected integrally at opposite ends thereof to the front portions 47 and 50 of rails 31 and 33, respectively. The ribs 35, 36, 37 and 43 are substantially parallel to one another and define elongated access openings or apertures, such as openings 60 and 62, to receive articles, such as article 12, therein. In this regard, the distance between adjacent ribs is sufficiently larger than the corresponding dimension of the articles to enable the ribs 35 and 36 to receive and retain the article therebetween.

As shown in FIGS. 1–3, the ribs 35, 36, 37 and 43 are curved outwardly to increase the contact area with the articles, and to facilitate the flexibility of the component 10. However, it will be understood by one skilled in the art that the ribs 35, 36, 37 and 43 could be substantially straight, or curved inwardly.

The organizer rack component 10 is a one-piece unit having a plurality of elongated access openings or apertures, such as the openings 60 and 62. Each one of the openings is configured to receive and to support one of the articles for storage purposes. The openings are arranged in equally spaced apart rows. The unit is generally elongated in shape and bowed about its midplane to provide a generally curved aspect. The unit is generally uniformly thick throughout its cross section.

Each one of the elongated openings, such as the openings 60 and 62, extend transversely across the face of the unit to permit the articles to extend therethrough and be supported thereby. Each one of the openings is generally curvilinear to help receive and support one end portion of one of the articles along a substantially continuous curve line of engagement therewith.

The organizer rack component 10 has at each curvilinear opening a left enlarged portion or support ear, such as the enlarged portions 40 and 41 for the respective ribs 35 and 36 to help support its article. Similarly, the organizer rack component further includes a right enlarged portion or support ear, such as the right enlarged portion 42 of the rib 43, at each opening spaced from the left enlarged portion to further help support its article at its opposite sides when disposed in the access openings. The enlarged portions are generally triangular in shape and extend or projection rearwardly to provide added depth for more support for the article.

The component 10 is disposed in a generally upright position with the curved aspect being disposed concave outwardly away from the pair of vertical spaced-apart balls 21 and 23 to receive the articles extending through the elongated openings between the walls. The elongated openings extend generally horizontally one above the other to enable the articles to be positioned generally horizontally in a cantilevered manner in a spaced apart column.

To facilitate the use of the organizer rack component 10 with similar organizer rack components (not shown) to form a continuous organizer rack structure (not shown), which will be described in greater detail hereinafter, the rib 35 is disposed at end portions 38 and 39 of rails 31 and 33, respectively. The rib 43 is disposed at opposite end portions 32 and 34 of the rails 31 and 33, respectively, but at a distance from the terminal end thereof corresponding to the distance between the ribs, such as ribs 35 and 36.

Pegs or ears 51–56 extend outwardly from the rails 31 and 33. In this regard, ears 51, 52 and 53 extend outwardly from the side portion 45 and ears 54, 55 and 56 extend outwardly from side portion 48 to enable the organizer rack component 10 to be mounted to the furniture item 20. In this regard, ears 51, 52 and 53 are received in the elongated vertical slot 25 while the ears 54, 55 and 56 are received in the elongated groove 26.

Although the use of the ears 51–53 and 54–56 is described herein, the ears 51–53 and 54–56 could be replaced by elongated flanges secured along the length of side portions 45 and 48, respectively. As will be described in greater detail hereinafter, though, the use of the ears 51–53 and 54–56 enable the organizer rack component 10 to be utilized with a furniture item having a plurality of circular openings rather than the elongated grooves 25 and 26.

The novel construction of the organizer rack component 10 enables it to be stored prior to installation in a novel manner which minimizes the potential for scratching the exterior portions thereof. By doing so, the appearance of the organizer rack component 10 remains intact, so that when installed, the organizer rack component 10 does not detract from the appearance of the high quality furniture, such as the furniture item 20.

Figure 1A:
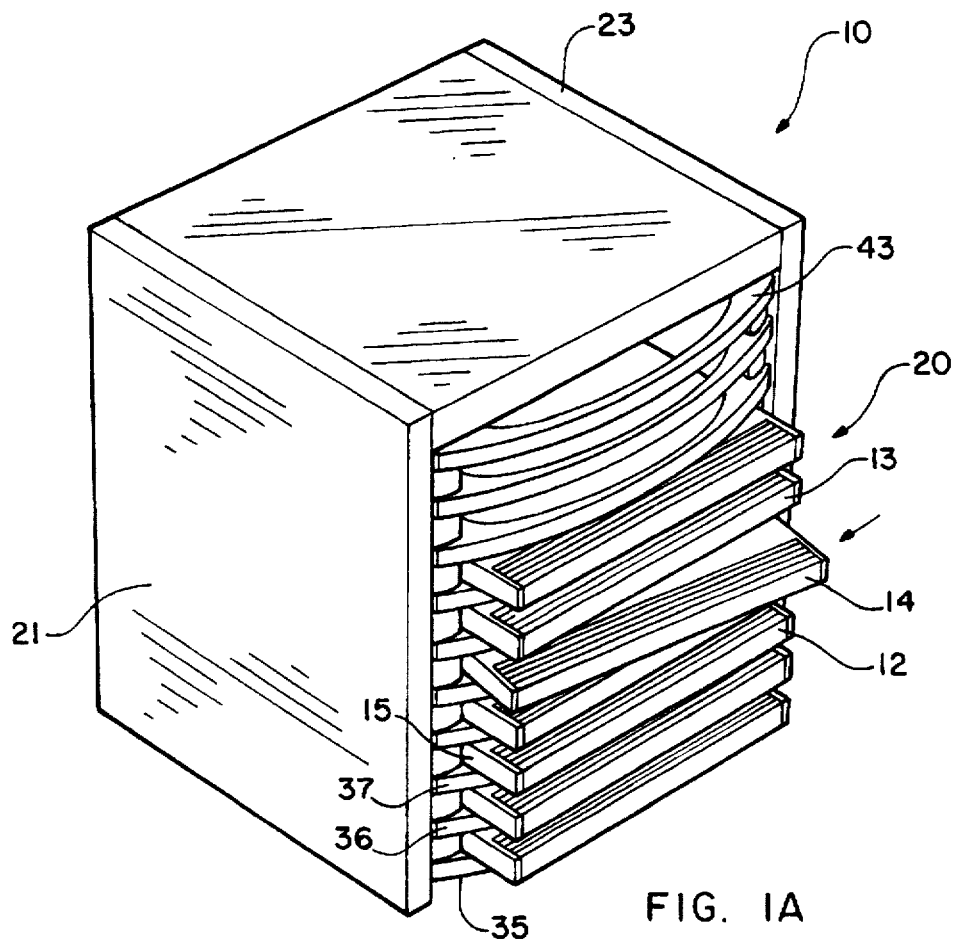
FIG. 1A is a reduced scale pictorial view of the rack component of FIG. 1, illustrating the component supporting a series of boxlike articles with one of them being in the process of being withdrawn according to the present invention.
Figure 1B:
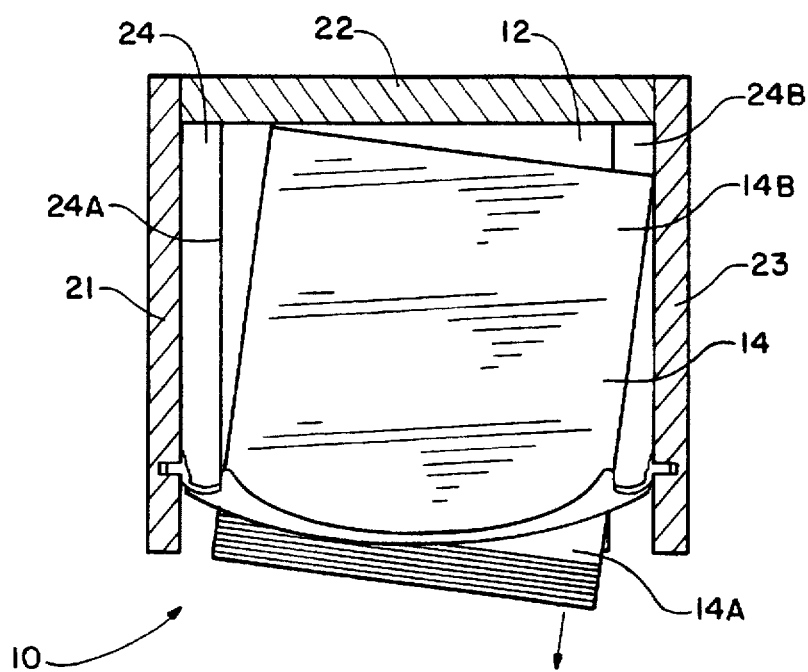
FIG. 1B is a plan sectional view of the component of FIG. 1A.

Referring now to FIGS. 1A and 1B, the novel rack component 10 may be utilized in accordance with the present invention to facilitate the easy withdrawal of one of the boxlike articles, which are stacked in a closely spaced configuration. In this regard, in addition to the boxlike article 12, there may be additional articles, such as articles 13, 14 and 15 as shown in FIG. 1A.

In this manner, the articles are arranged in a vertical stack, and are closely spaced. The articles, such as compact disc boxes, are thin, and thus it is difficult for a person to grasp the article between the fingers for withdrawing them from the rack component 10. However, in accordance with the present invention, the articles can be withdrawn individually and selectively by pivoting them into a position as shown in FIG. 1B for ready withdrawal from the rack component 10.

The rack component 10 is disposed across the opening generally indicated at 24 defined by the U-shaped supporting surface structure with the rack access openings being disposed horizontally before receiving individual ones of the boxlike articles. A series of the boxlike articles are then disposed within the rack openings with their front end portions projecting partially from the front face of the rack component 10 to support the articles in the closely spaced configuration as indicated in FIG. 1A. The boxlike articles are spaced sufficiently from the side walls 21 and 23 to permit the articles to pivot individually by a substantial distance to facilitate removal of a desired one of the articles, such as the article 14, from the rack 10. In order to facilitate the pivotal movement, the space 24 includes a pair of side spaces 24A and 24B which spaces the stack of articles from the respective side walls 21 and 23. The side spaces are sufficient to permit the articles to pivot for easy withdrawal from the component 10.

In order to withdraw a selected article, such as the article 14, a manual force is applied by the finger of the user to the article 14 at a front corner portion 14A as indicated by the arrow in FIG. 1A, to cause the article 14 to pivot until a corresponding rear corner side portion 14B engages the adjacent sidewall 23. In this regard, the front corner side portion 14A then projects outwardly and forwardly beyond the stack of other remaining stored articles for easy engagement by the fingers of the user. In this manner, the article 14 can then be grasped conveniently at the front side corner portion 14A and pulled in the direction of the arrow shown in FIG. 1B outwardly from the component 10 for withdrawal of the article 14 for use purposes.

Referring now to FIGS. 4 and 4A, the ability to stack or nest like organizer rack components 410, 480 and 496 is illustrated. In this regard, the organizer rack component 480 is shown nested within the organizer rack component 410. The organizer rack component 496 is shown aligned with the organizer rack component 480, and positioned to be received within the organizer rack component 480.

As shown in FIG. 4A, the rails 412 and 482 of the organizer rack components 410 and 480, respectively, are adapted to facilitate the nesting of like organizer rack components. In this regard, the rails 412 and 482 are substantially similar in construction to the rails 31 and 33 (FIGS. 2–3), and include front portions 414 and 484, side portions 418 and 488, and intermediate portions 416 and 486, respectively. The intermediate portions 416 and 486 are offset inwardly from the side portions 420 and 480 to define shoulders 420 and 490, respectively.

The intermediate portions 416 and 490 are offset sufficiently from the side portions 418 and 488 to receive the side portion 418. In this regard, the side portion 418 engages the intermediate portion 486 when the organizer rack component 480 is nested within the organizer rack component 410. The side portion 418 engages and abuts the shoulder 490, wherein the organizer rack component 480 is supported above the organizer rack component 410 at about the shoulder 490.

Considering now the use of multiple organizer rack components, such as organizer rack component 510 and 590, to form a continuous rack structure 500 (FIG. 5), the organizer rack component 510 is combined substantially seamlessly with the organizer rack component 590 to form the continuous uninterrupted organizer rack structure 500.

The organizer rack components 510 and 590 are substantially similar to the organizer rack component 10 (FIGS. 1–3) and also define a series of elongated access openings to receive boxlike articles. The organizer rack component 510 includes a rib 530 connected integrally at end portions thereof to rails 512 and 518 at about end portions 514 and 520, thereby forming a continuous portion 529 extending from the end portion 520, across the rib 530, to the end portion 514. Another rib 532 is connected integrally at its end portions to opposite end portions 516 and 522 of rails 512 and 518, respectively, at a given distance from the terminal ends thereof. The given distance corresponds substantially to the spacing between adjacent ribs.

The organizer rack component 590 includes a rib 597 connected integrally between rails 591 and 594 at end portions 592 and 595 thereof, thereby forming a substantially continuous portion 599 extending from the end portion 595, across the rib 597 to the lower portion 592. Another rib 598 is connected integrally at its end portions to opposite end portions 593 and 596 of the rails 591 and 594, respectively, and at the given distance from the terminal ends thereof.

In use, the component 510 is positioned adjacent to the component 590, and the rails 512 and 518 are aligned with the rails 591 and 594, respectively. The components 510 and 590 are then moved into engagement with one another, wherein the opposite end portions 516 and 522 of component 510 engage the continuous portion 599 of component 590.

Lines of abutment 580 and 581, indicative of the plane at which opposite end portions 516 and 522 meet surface 599 at end portions 592 and 595 are the only visual indications that two organizer rack components 510 and 590 have been combined to form the organizer rack structure 500. However, when viewed as installed on a furniture item (not shown), the lines of abutment 580 and 581 are difficult to discern.

Figure 6:
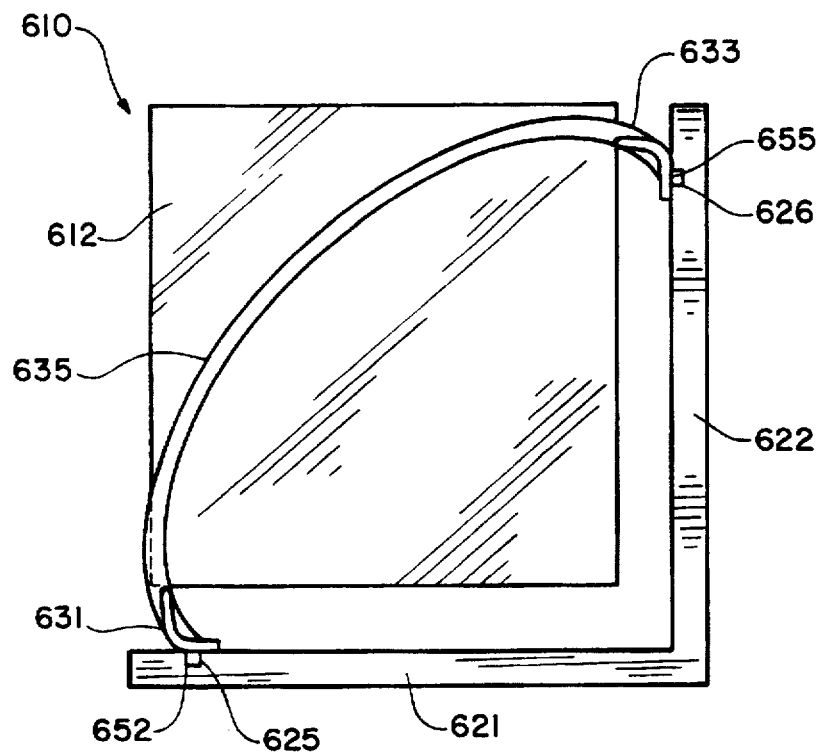
FIG. 6 is a side elevational view of another organizer rack component, which is also constructed in accordance with the present invention.

Referring now to FIG. 6, there is shown another organizer rack component 610 which is also constructed in accordance with the present invention. The organizer rack component 610 is substantially similar to the organizer rack component 10 (FIG. 1). However, the organizer rack component 610 is adapted for use in a corner of a furniture item having a horizontal shelf 621 and a vertical wall 622 to support a boxlike article 612.

In this regard, the organizer rack component 610 includes a pair of elongated spaced apart parallel rails 631 and 633, and a series of spaced apart ribs, such as rib 635, connected at their end portions to the rails 631 and 633. Ears 652 and 655 extending outwardly from the rails 601 and 633, respectively, engage elongated grooves 625 and 626 in the shelf 621 and 622, respectively, to secure the organizer rack component 610.

Unlike the organizer rack component 10 (FIGS. 1-3) where the ears 51-53 extend in a substantially opposite direction from the ears 54-56, the ear 652 extends outwardly at about a right angle to the ear 655 to facilitate the mounting of the organizer rack component 610 to the shelf 621 and the wall 622.

Figure 7:
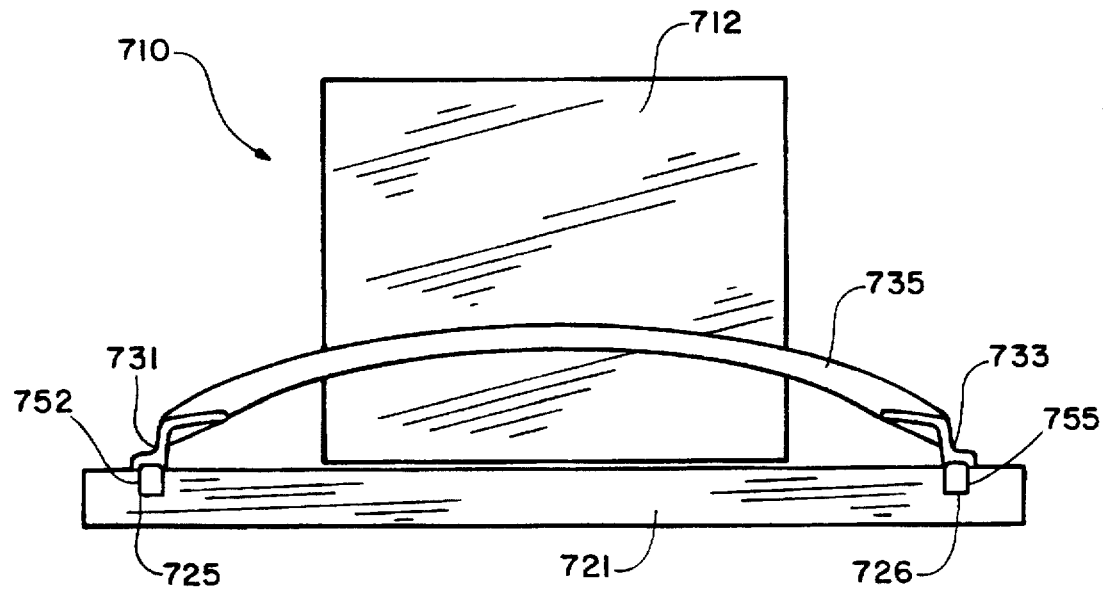
FIG. 7 is a side elevational view of a further organizer rack component, which is also constructed in accordance with the present invention.

Referring now to FIG. 7, there is shown another organizer rack component 710 which is also constructed in accordance with the present invention. The organizer rack component 710 is substantially similar to the organizer rack component 10 (FIGS. 1-3) except that the component 710 is adapted for use on a horizontal surface of a furniture item. The component 710 includes elongated rails 731 and 733 to enable the organizer rack component 710 to be secured to a shelf 721. A series of parallel spaced apart ribs, such as rib 735, are connected integrally at their end portions to the rails 731 and 732 to facilitate storing a boxlike article 712 therebetween.

Ears 752 and 755 extending outwardly from the rails 731 and 732, respectively, are received within elongated spaced-apart grooves 725 and 726 in the shelf 721. The ears 752 and 755 extend downwardly substantially parallel to one another to facilitate the coupling of the organizer rack component 710 to the horizontal shelf 721.

Figure 8:
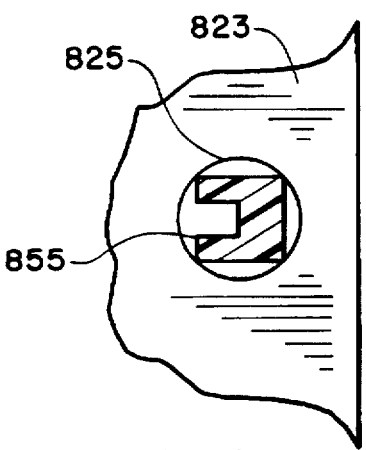
FIG. 8 is a cut-away elevational view of another organizer rack component cooperating with another item of furniture in accordance with the present invention.

As described previously, spaced apart circular holes may be utilized in a furniture item rather than elongated grooves or slots. Referring to FIG. 8, there is shown a partial wall 823 of a furniture item having a circular opening 825 therein. For ease of illustration, only one opening is shown in the wall 823. It will be understood by one skilled in the art that the number of openings will correspond to, or exceed, the number of ears projecting from a rail of an organizer component (not shown).

An ear 855 extending outwardly from the organizer rack component (not shown) is received within the opening 825, thereby securing the organizer rack component to the furniture item at the wall 823.

With the component 710 disposed in a horizontal position with its elongated openings extending generally in a common horizontal plane, the articles are enabled to be positioned generally vertically in an equally spaced apart row for convenient access by the user.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An organizer rack component for use with furniture wall means supporting a plurality of boxlike articles, comprising:

a pair of parallel spaced apart elongated rails;

a series of substantially parallel, spaced apart ribs having opposite ends connected integrally to said rails for defining a series of elongated access openings to receive the articles therein, wherein said ribs are spaced apart by a given distance sufficiently larger than a corresponding dimension of the articles to enable said ribs to retain the articles therebetween;

mounting means for helping secure the organizer rack component to the furniture means;

wherein one of said ribs is connected to said rails at about end portions thereof at about said given distance from terminal ends thereof, and another one of said ribs is connected to said rails at opposite end portions thereof to define a continuous portion thereat to facilitate the combining of like organizer rack components to appear to be a single continuous unit in an aesthetically appealing manner.

2. A method of making an organizer rack component for use with furniture wall means for supporting boxlike articles, comprising:

spacing apart a pair of parallel elongated rails;

connecting integrally at their opposite ends a series of parallel ribs to said rails to define a series of elongated access openings for receiving and supporting the articles;

spacing apart the ribs by a sufficient distance to accommodate the corresponding dimension of the articles;

extending mounting means outwardly from said rails for helping secure the organizer rack component to the furniture wall means; and connecting one of said ribs to said rails at about the end portions thereof at about said distance from terminal ends thereof, and connecting another one of said ribs to said rails at opposite end portions thereof to define a continuous portion thereat to facilitate the combining of like organizer rack components to appear to be a single continuous unit in an aesthetically appealing manner.

3. An organizer rack component adapted to cooperate with a supporting surface for supporting a plurality of boxlike articles, comprising:

a one-piece unit having a plurality of means defining elongated access openings therein each configured to receive and support one of the article for storage purposes, said openings being arranged in equally spaced apart rows;

the unit being generally elongated in shape and bowed about its midplane to provide a generally curved aspect, and being generally uniformly thick throughout its cross section;

each one of said means defining elongated openings extending transversely across the face of the unit to permit the articles to extend therethrough and be supported thereby, each one of said openings being generally curvilinear to help receive and support one end portion of one of the articles along a substantially continuous curved line of engagement therewith; and wherein said means defining elongated openings has at each curvilinear opening, at least one enlarged portion to help support its article.

4. An organizer rack component according to claim 1, wherein each one of said rails is L-shaped and includes a front portion and a side portion substantially perpendicular to said front portion, said rib opposite ends being connected to said rails at said front portions thereof, and said portions being adapted to substantially abut the furniture wall means.

5. An organizer rack component according to claim 1, wherein said rails further include an intermediate portion offset inwardly to define a shoulder.

6. An organizer rack component according to claim 1, wherein said mounting means includes a plurality of ears.

7. An organizer rack component according to claim 1, wherein said mounting means includes an elongated flange extending along the length of said rails.

8. An organizer rack component according to claim 1, wherein said mounting means extend outwardly from one of said rails at about an opposite direction from said mounting means extending outwardly from said other one of said rails.

9. An organizer rack component according to claim 1, wherein said mounting means extend outwardly from one of said rails at about a right angle from said mounting means extending outwardly from said other one of said rails.

10. An organizer rack component according to claim 1, wherein said mounting means extend outwardly from each one of said rails in substantially the same direction.

11. An organizer rack component according to claim 1, wherein said rails and said ribs are constructed from a flexible resilient material.

12. An organizer rack component according to claim 11, wherein said flexible resilient material is a thermoplastic material.

13. An organizer rack component according to claim 1, wherein said ribs are curved outwardly from the furniture wall means.

14. A method according to claim 2, further including constructing said rails in an L-shape having a front portion and a side portion substantially perpendicular to said front portion.

15. A method according to claim 14, further including defining a shoulder with an intermediate portion offset inwardly from said side portion.

16. A method according to claim 14, further including extending said mounting means outwardly from one of said rails at about an opposite direction from said mounting means extending outwardly from said other one of said rails.

17. A method according to claim 14, further including extending said mounting means outwardly from one of said rails at about a right angle from said mounting means extending outwardly from said other one of said rails.

18. A method according to claim 14, further including extending said mounting means outwardly from each one of said rails in substantially the same direction.

19. An organizer rack component according to claim 3, further including another enlarged portion at each opening spaced from the first mentioned enlarged portion to further help support its article at its opposite sides.

20. An organizer rack component according to claim 3, further including means for helping to secure said unit in a generally upright position with its elongated openings extending generally horizontally one above the other to enable the articles to be positioned generally horizontally in a cantilevered manner in a spaced apart column.

21. An organizer rack component according to claim 3, further including means for helping to secure said unit in a generally horizontal position with its elongated openings extending generally in a common horizontal plane to enable the articles to be positioned generally vertically in an equally spaced apart row.

22. A method of mounting the storage rack of claim 3, disposing said unit in a generally upright position;

attaching the upright unit to a pair of vertical spaced-apart walls with the curved aspect being disposed concave outwardly away from said walls to receive the articles extending through the elongated openings between the walls.

23. A method according to claim 22, further comprising:

using mounting means extending outwardly from said unit;

flexing the unit to adjust the spacing between said mounting means;

aligning said mounting means with spaced apart openings in the supporting surface;

inserting said mounting means into the spaced apart openings; and releasing said unit, wherein said unit is secured to the supporting surface.

24. A method of using an organizer rack component adapted to cooperate with a generally U-shaped supporting surface means for supporting a plurality of boxlike articles therewithin, the supporting surface means having a back wall and a pair of side walls, comprising:

disposing the rack component across an opening defined by said U-shaped supporting surface means, the rack component having access openings therein;

disposing a series of boxlike articles through the rack openings and projecting partially from the front face thereof to support the articles in a closely spaced configuration sufficiently spaced apart from the sidewalls to permit the articles to pivot individually by a substantial distance to facilitate removal of a desired one of the articles from the rack;

applying a force to a selected one of the articles at a front corner side portion projecting forwardly of the rack component to cause the article to pivot until a corresponding rear corner side portion engages the adjacent side wall; and grasping said front corner portion and withdrawing it from the rack component.

* * * * *